US011475100B2

(12) United States Patent
Han

(10) Patent No.: US 11,475,100 B2
(45) Date of Patent: Oct. 18, 2022

(54) DEVICE AND METHOD FOR CONVOLUTION OPERATION

(71) Applicant: SAPEON KOREA INC., Seongnam-si (KR)

(72) Inventor: Jeongho Han, Seoul (KR)

(73) Assignee: SAPEON KOREA INC., Seongnam-si (KR)

( * ) Notice: Subject to any disclaimer, the term of this patent is extended or adjusted under 35 U.S.C. 154(b) by 163 days.

(21) Appl. No.: 17/034,886

(22) Filed: Sep. 28, 2020

(65) Prior Publication Data

US 2021/0011970 A1 Jan. 14, 2021

Related U.S. Application Data

(63) Continuation of application No. PCT/KR2019/003440, filed on Mar. 25, 2019.

(30) Foreign Application Priority Data

Mar. 27, 2018 (KR) ........................ 10-2018-0035104

(51) Int. Cl.
*G06F 17/15* (2006.01)
*G06F 17/16* (2006.01)
*G06N 3/08* (2006.01)

(52) U.S. Cl.
CPC .............. *G06F 17/15* (2013.01); *G06F 17/16* (2013.01); *G06N 3/08* (2013.01)

(58) Field of Classification Search
CPC ......... G06F 17/15; G06F 17/16; G06F 17/153
(Continued)

(56) References Cited

U.S. PATENT DOCUMENTS

2016/0340508 A1* 11/2016 Kim .................... C08L 23/0869
2017/0103311 A1   4/2017 Henry et al.
(Continued)

FOREIGN PATENT DOCUMENTS

KR   10-2017-0005562 A    1/2017

OTHER PUBLICATIONS

Lee, H.-J. et al., "Generalized Cannon's algorithm for parallel matrix multiplication," Proceedings of the 11$^{th}$ International Conference on Supercomputing, Jul. 1997, pp. 44-51.

*Primary Examiner* — Tan V Mai
(74) *Attorney, Agent, or Firm* — Fenwick & West LLP

(57) ABSTRACT

In accordance with an aspect of the present disclosure, there is provided a convolution operation method. The method comprises, extracting, from a feature data with a M×N matrix (M and N are a natural number), a plurality of separate sub-matrices which have identical dimensions to a convolution kernel with a K×L matrix (K is a natural number equal to or smaller than M, and L is a natural number equal to or smaller than N); generating a first vector which includes elements of at least one of the sub-matrices as elements of the first vector, and a second vector which includes elements of the convolution kernel as elements of the second vector; extracting, from the first vector, a partial vector including all elements of the sub-matrix, for each of the sub-matrices; and deriving a result of a convolution operation by multiplying between each element of the partial vector corresponding to each of the sub-matrices and each element at a corresponding position in the second vector, and by adding results of the multiplication.

18 Claims, 14 Drawing Sheets

(58) Field of Classification Search
USPC .......................................................... 708/420
See application file for complete search history.

(56) References Cited

U.S. PATENT DOCUMENTS

| | | |
|---|---|---|
| 2017/0103316 A1 | 4/2017 | Ross et al. |
| 2017/0372071 A1 | 12/2017 | Saxe |
| 2020/0364288 A1* | 11/2020 | Wen .................. G06N 3/0454 |
| 2021/0182666 A1* | 6/2021 | Han .................. G06F 17/153 |
| 2021/0241095 A1* | 8/2021 | Gong .................. G06F 7/5443 |

* cited by examiner output(0,0) = 1∗1 + 0∗0 + 0∗1
             + 0∗0 + 2∗3 + 0∗0    ⎤ 9 MULTIPLICATION
             + 4∗0 + 0∗0 + 0∗1    ⎦

144 (=9 X 16) MULTIPLICATION FOR OUTPUT output(0,0) = 1∗1 + 0∗1 + 2∗3 + 0∗1    4 MULTIPLICATION
            = 7

64 (=4 X 16) MULTIPLICATION FOR OUTPUT output(0,0) = 1∗1 + 2∗3
            = 7            2 MULTIPLICATION

21 MULTIPLICATION FOR OUTPUT

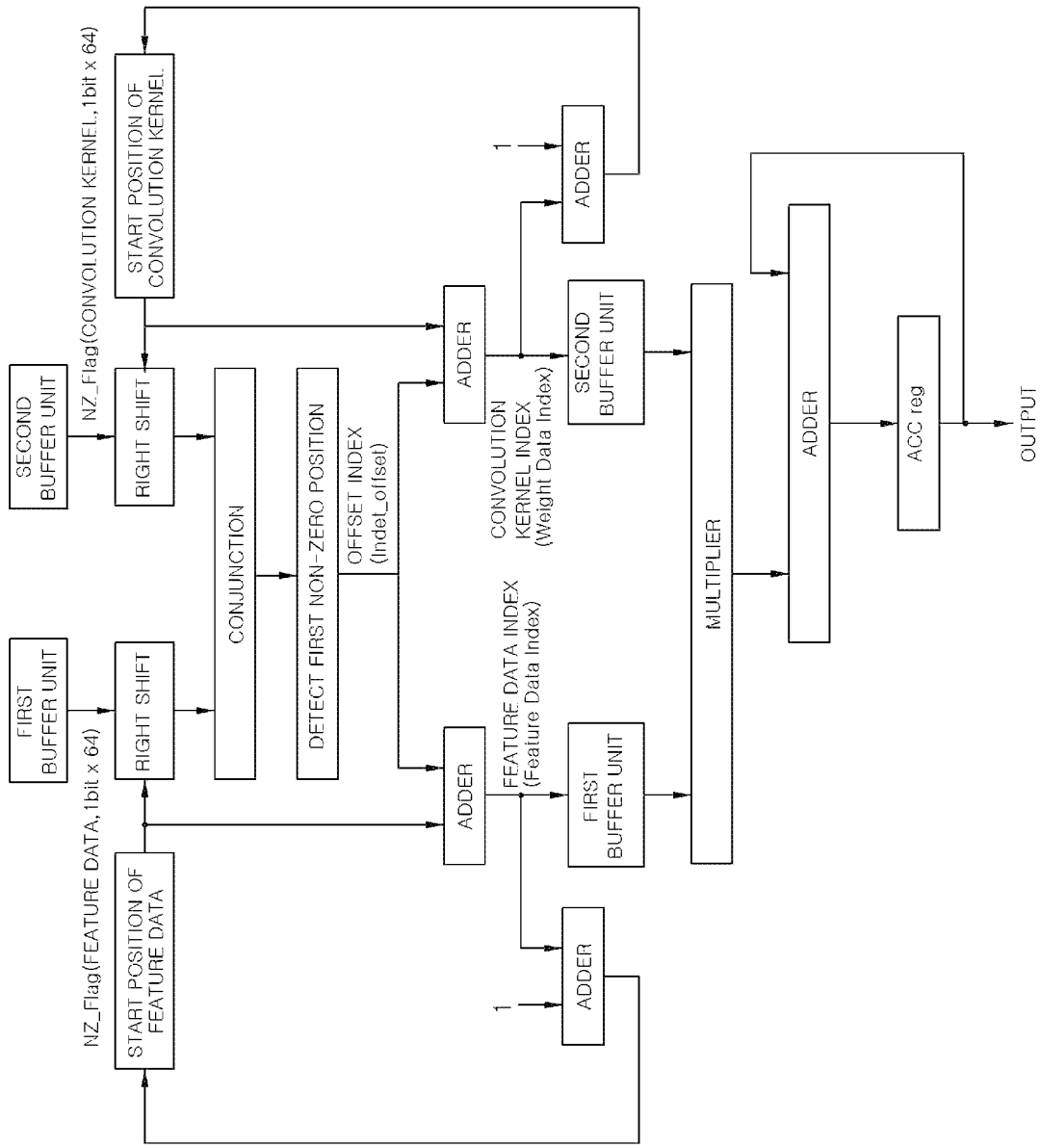

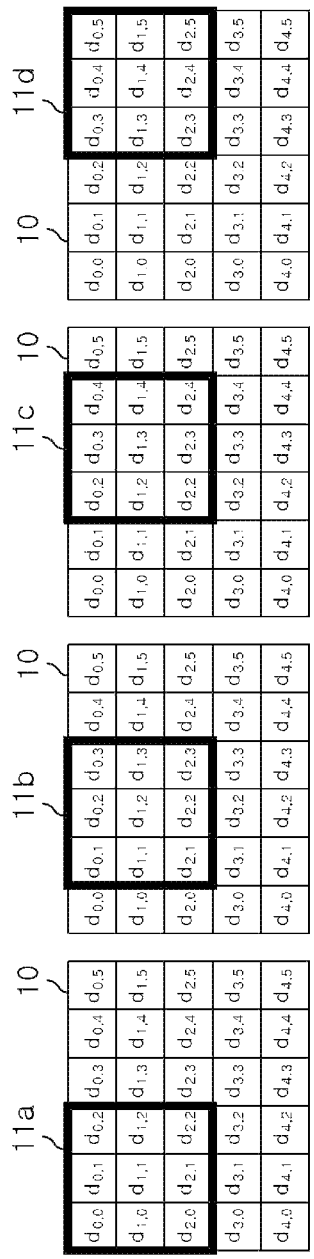
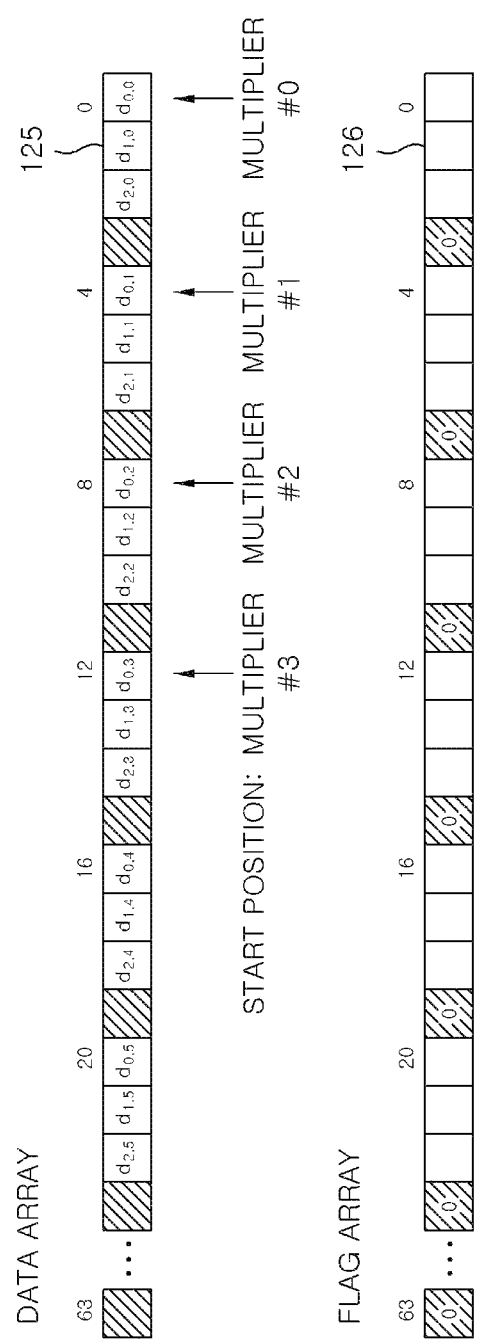

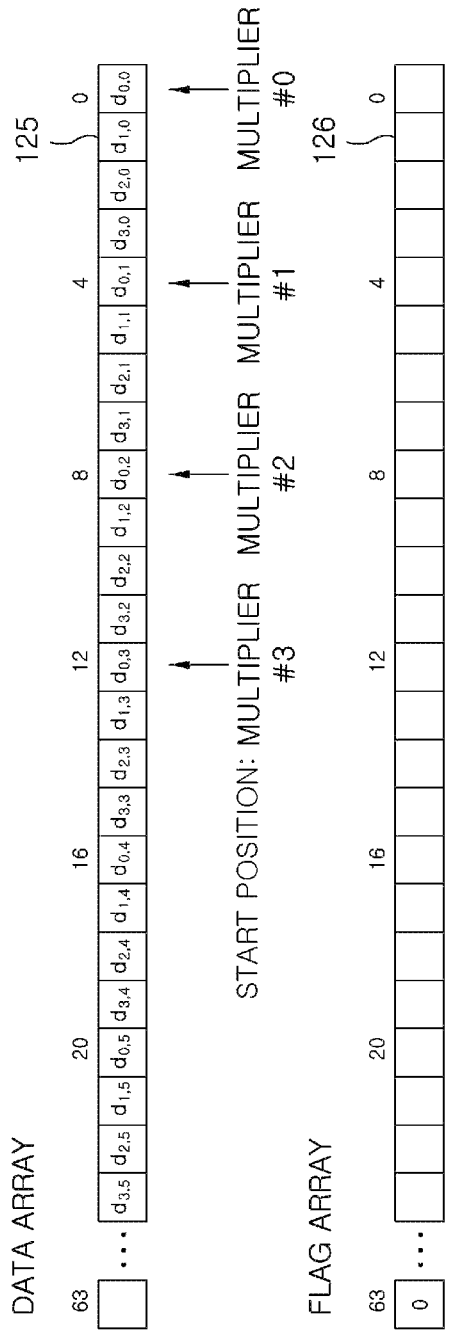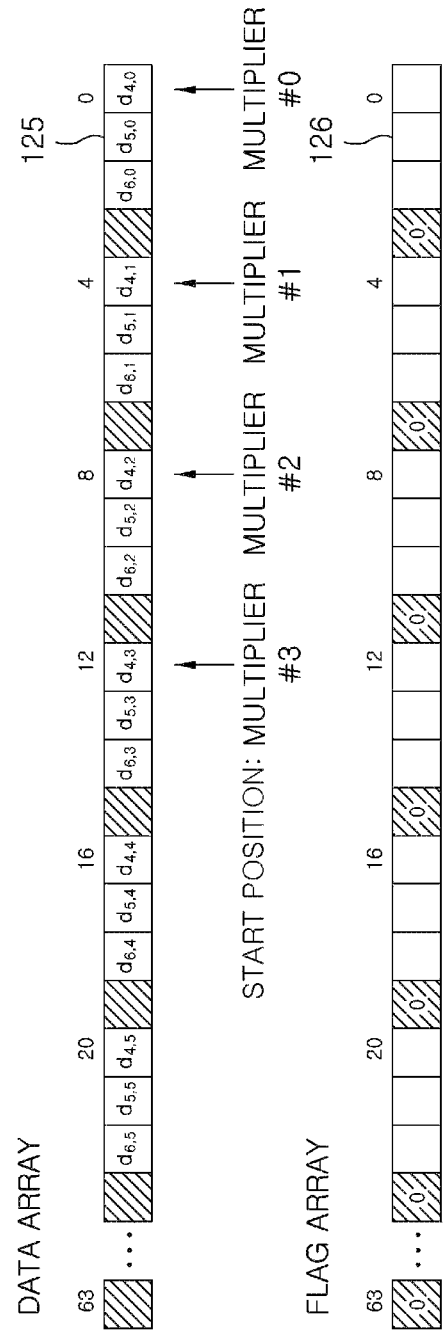

FIG. 7A

DEVICE AND METHOD FOR CONVOLUTION OPERATION

CROSS-REFERENCE TO RELATED APPLICATIONS

This application is a bypass continuation application of PCT/KR2019/003440 filed on Mar. 25, 2019, which claims priority to Republic of Korea Patent Application No. 10-2018-0035104, which are incorporated by reference herein in their entirety.

TECHNICAL FIELD

The present disclosure relates to a device and a method for efficiently performing a convolution operation when recognizing target data by using a feature extraction model such as a convolution neural network (CNN).

For reference, this application claims priority to Korean Patent Application No. 10-2018-0035104, filed on Mar. 27, 2018. The entire contents of the application on which the priority is based are incorporated herein by reference.

BACKGROUND

Technologies for classifying target data for recognition by category or extracting information included in the target data for recognition by automatically recognizing the target data for recognition such as image data or text data are recently in the limelight as technologies for an artificial intelligence (AI). The technologies not only simply recognize the category of an object in the image data but also may be utilized in various fields of self-driving, medical image analysis, security system and the like.

Particularly, machine learning techniques such as deep learning recently have been applied to data recognition technologies. Among the deep learning techniques, well-known convolution neural network techniques show high performance in image data recognition.

However, in processes of recognizing the information included in the target data for recognition by using the convolution neural network techniques, the convolution operation consisting of a combination of multiplication and addition is performed a plurality of times. The convolution operation that requires a large amount of calculations repetitively performed may be obstacles to data recognition through the convolution neural network techniques. Particularly, in fields of image data recognition in which speedy calculation is important, such as the self-driving described above, time spent for the convolution operation may be a large problem.

Further, although there have been many studies on a method for efficiently performing the convolution operation, there are a lot of problems for implementing devices, for example, the studies to achieve efficiency in algorithm causes hardware configurations to be complicated.

(Patent Document 1) Publication of unexamined Korean Patent Application No. 10-2016-0122452 (published on Oct. 24, 2016)

SUMMARY

The problem to be solved by the present disclosure is to provide a device and a method for a convolution operation, when the convolution operation is performed, to achieve efficiency in calculation and rationalization for implementing devices.

However, the problem to be solved by the present disclosure is not limited to those described above, and another problem to be solved which is not described may be clearly understood by those skilled in the art to which this present disclosure belongs from the following description.

In accordance with an aspect of the present disclosure, there is provided a convolution operation method. The method includes, extracting, from a feature data with a M×N matrix (M and N are a natural number), a plurality of separate sub-matrices which have identical dimensions to a convolution kernel with a K×L matrix (K is a natural number equal to or smaller than M, and L is a natural number equal to or smaller than N); generating a first vector which includes elements of at least one of the sub-matrices as elements of the first vector, and a second vector which includes elements of the convolution kernel as elements of the second vector; extracting, from the first vector, a partial vector including all elements of the sub-matrix, for each of the sub-matrices; and deriving a result of a convolution operation by multiplying between each element of the partial vector corresponding to each of the sub-matrices and each element at a corresponding position in the second vector, and by adding results of the multiplication.

In accordance with another aspect of the present disclosure, there is provided a convolution operation device. The convolution operation device includes a first buffer unit configured to extract, from a feature data with a M×N matrix (M and N are a natural number), a plurality of separate sub-matrices which have identical dimensions to a convolution kernel with a K×L matrix (K is a natural number equal to or smaller than M, and L is a natural number equal to or smaller than N) and to generate a first vector which includes elements of at least one of the sub-matrices as elements of the first vector; a second buffer unit configured to generate a second vector which includes elements of the convolution kernel as elements of the second vector; and an operation unit configured to extract, from the first vector, a partial vector including all elements of the sub-matrix, for each of the sub-matrices, and to derive a result of a convolution operation by multiplying between each element of the partial vector corresponding to each of the sub-matrices and each element at a corresponding position in the second vector, and by adding results of the multiplication.

According to one embodiment of the present disclosure, a buffer unit of the device for the convolution operation may consist of an upper buffer unit having a structure of high data storage efficiency per unit area and a lower buffer unit having a structure which is possible to simultaneously read a plurality of data of various positions. In addition, through a technique for selecting data storage position in the lower buffer unit, area for configuring the buffer unit may be reduced.

Through this, the effect on implementing the device such as space efficiency may be achieved, and the efficiency in calculation may be achieved together. Further, since convolution kernels and strides of various sizes are supported, convenience may be further improved.

BRIEF DESCRIPTION OF THE DRAWINGS

FIG. 3C shows a diagram illustrating a configuration of a convolution operation device according to one embodiment of the present disclosure.

FIG. 4A shows a diagram illustrating a convolution operation process performed by a convolution operation device according to one embodiment of the present disclosure.

FIG. 4B shows a diagram illustrating a convolution operation process performed by a convolution operation device according to one embodiment of the present disclosure.

FIG. 5A shows a diagram illustrating a convolution operation process performed by a convolution operation device according to one embodiment of the present disclosure.

FIG. 6A shows a diagram illustrating a case where splitting of a convolution kernel is applied in a convolution operation process according to one embodiment of the present disclosure.

FIG. 6B shows a diagram illustrating a case where splitting of a convolution kernel is applied in a convolution operation process according to one embodiment of the present disclosure.

FIG. 6C shows a diagram illustrating a case where splitting of a convolution kernel is applied in a convolution operation process according to one embodiment of the present disclosure.

FIG. 7A shows a diagram illustrating a case where increase of a stride is applied in a convolution operation process according to one embodiment of the present disclosure.

DETAILED DESCRIPTION

Figure 1A:
FIG. 1A shows a diagram illustrating a zero skip technique in a convolution operation.
Figure 1B:
FIG. 1B shows a diagram illustrating a zero skip technique in a convolution operation.
Figure 1C:
FIG. 1C shows a diagram illustrating a zero skip technique in a convolution operation.

FIGS. 1A to 1C show diagrams illustrating a zero skip technique in a convolution operation. Referring to FIG. 1A, feature data 10 indicating features of target data for recognition and a convolution kernel 20, serving as a kind of a filter, for extracting the features from the feature data 10 are illustrated. The feature data 10 and the convolution kernel 20 may be both expressed in matrix forms. When the convolution operation is performed by applying the convolution kernel 20 to the feature data 10, output data 30 also having a matrix form may be derived.

Hereinafter, a process of calculating an element (output (0,0)) in the output data 30 which has the first row number and the first column number will be described. For the process, multiplying an (i,j)th element of a sub-matrix 11, as a part of the feature data 10, to which the convolution kernel 20 is applied and an (i,j)th element of the convolution kernel 20 may be repetitively performed for every i and every j, and the results of the multiplication may be added together. Of course, the sub-matrix 11 may have an identical dimension to the convolution kernel 20.

In this case, it may be seen that the result of above calculation is seven, and the total number of the multiplication performed for deriving the result is nine that is equal to the number of elements of the feature data 10 or the convolution kernel 20. Since the total number of elements of the output data 30 is sixteen, the total number of the multiplication performed for deriving the output data 30 is 144 that is nine times sixteen.

Considering general properties of a convolution neural network model, there is high possibility that zero exists in target elements for the convolution operation. Therefore, it may be considered that if there is zero in both elements to be multiplied, the multiplication is omitted and skipped. FIG. 1B illustrates a method of omitting multiplication for elements of zero in the convolution kernel 20. According to the method, since five elements are zero among nine elements of the output data 30, the number of multiplication for deriving one element of the output data 30 is four, and thus the total number of multiplication for deriving the output data 30 is sixty-four that is four times sixteen.

FIG. 1C illustrates a case in which the method illustrated in FIG. 1B is further developed. According to FIG. 1C, not only elements of zero in the convolution kernel 20 but also elements of zero in the feature data 10 are considered. Therefore, multiplication is actually performed when both elements to be multiplied are not zero so that the total number of multiplication for deriving the output data 30 is just twenty-one in case of FIG. 1C.

Since multiplication in itself consumes hardware resources and time, reducing the number of the multiplication indicates increase of efficiency in the convolution operation. As described above, since it is obvious that if at least one of both elements to be multiplied is zero, the result is zero, if the multiplication is omitted in the above case, the efficiency in the convolution operation may be significantly increased. However, to actually implement such an idea, a specific method and a proper embodiment of a hardware to perform the specific method are needed.

Figure 2:
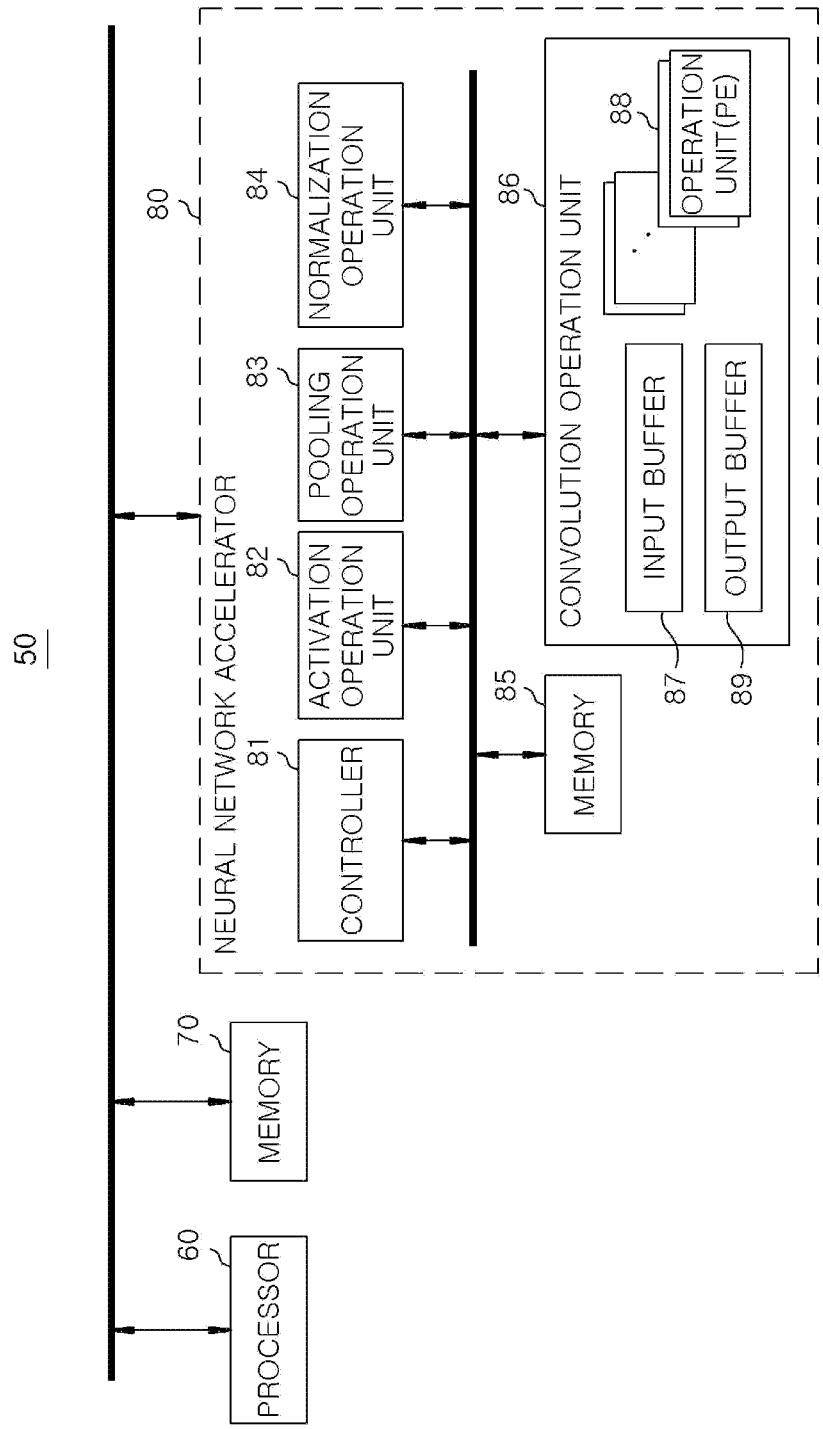
FIG. 2 shows a diagram illustrating a hardware for applying a convolution neural network technique.

FIG. 2 shows a diagram illustrating a hardware 50 for applying a convolution neural network technique. The hardware 50 in the FIG. 2 may include a processor 60 for controlling overall operation of the hardware 50, a memory 70 storing data for the operation of the hardware 50, and a neural network accelerator 80 performing a convolution operation for the convolution neural network technique.

Particularly, the neural network accelerator 80 may include a controller 81 for controlling operation of the neural network accelerator 80, an activation operation unit 82 performing activation operation, a pooling operation unit 83 performing pooling operation, a normalization operation unit 84 performing normalization when data is transmitted between layers, a memory 85 for storing data, and a convolution operation unit 86 directly performing the convolution operation. The convolution operation unit 86 may include an input buffer 87 for storing input data to which the convolution operation is applied, an operation unit (such as processing elements) 88 applying the convolution operation to the input data, and an output buffer 89 storing a result of the convolution operation performed by the operation unit 88.

Figure 3A:
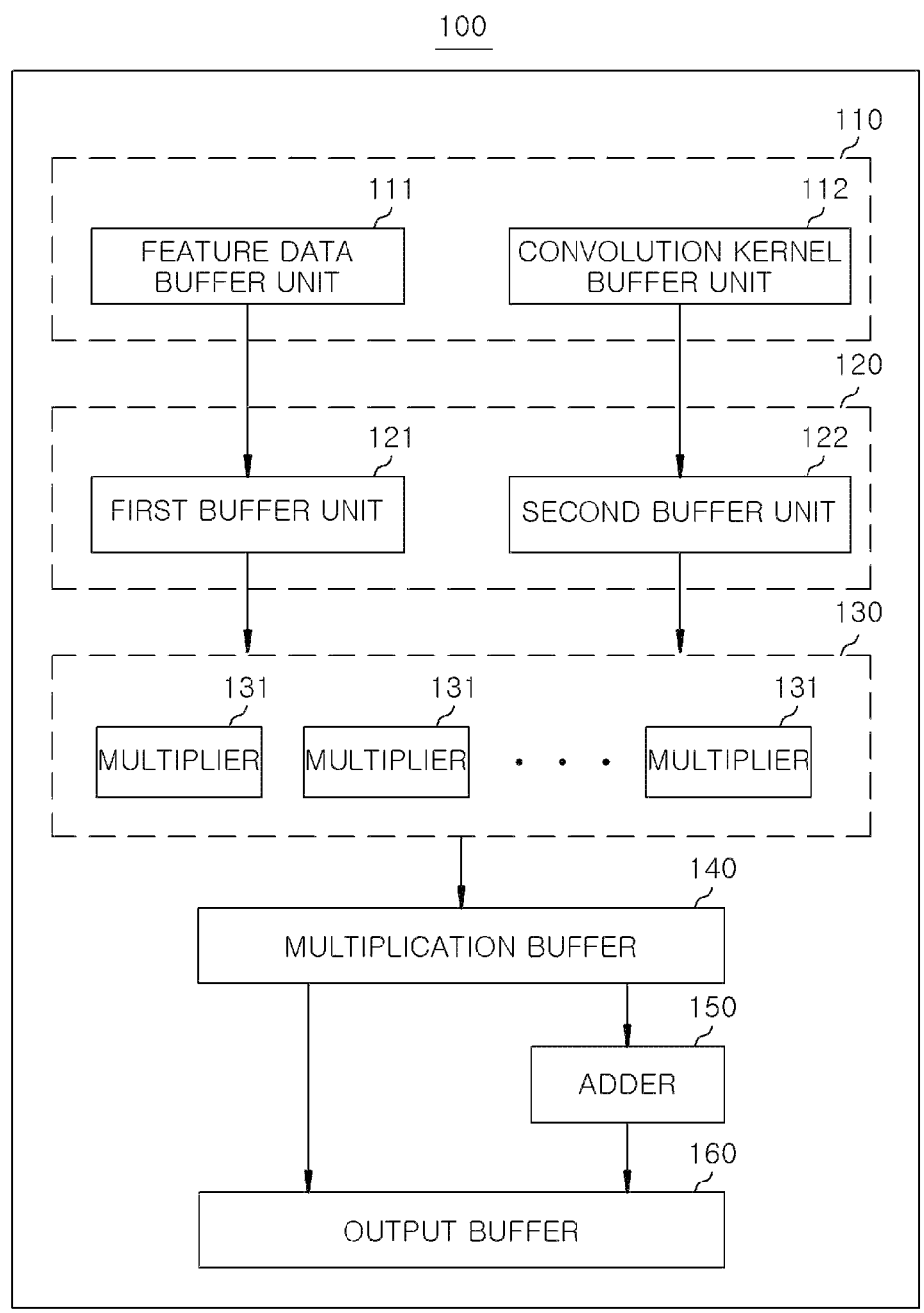
FIG. 3A shows a diagram illustrating a configuration of a convolution operation device according to one embodiment of the present disclosure.
Figure 3B:
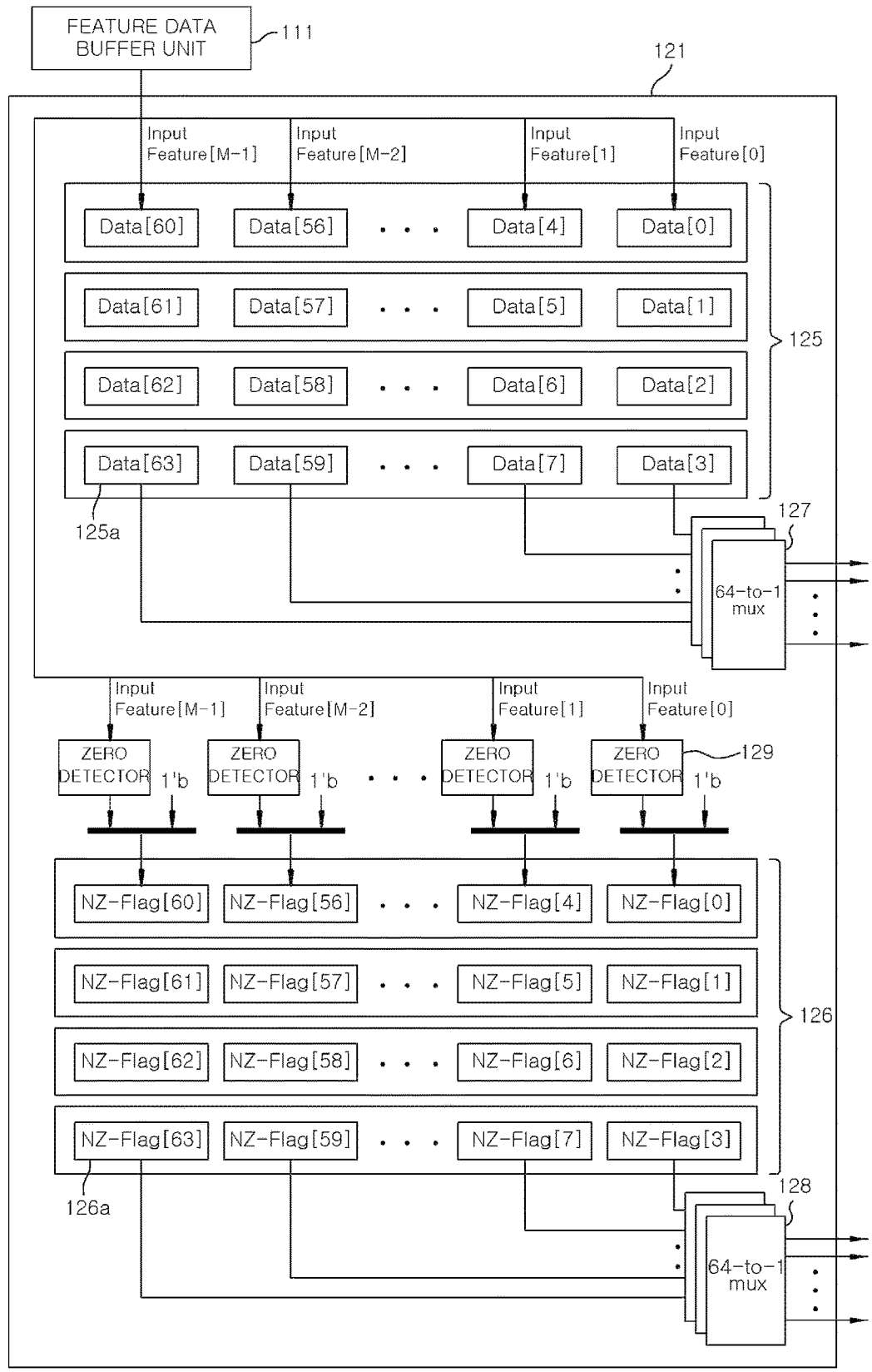
FIG. 3B shows a diagram illustrating a configuration of a convolution operation device according to one embodiment of the present disclosure.

FIGS. 3A to 3C show diagrams illustrating a configuration of a convolution operation device 100 according to one embodiment of the present disclosure. As illustrated in FIG. 3A, the convolution operation device 100 according to one embodiment of the present disclosure may include an upper buffer unit 110, a lower buffer unit 120, an operation unit 130, a multiplication buffer 140, an adder 150, and an output buffer 160. However, since the convolution operation device 100 to be described in FIGS. 3A to 3C is just one embodiment of the present disclosure, the technical ideas of the present disclosure are not limited by FIGS. 3A to 3C.

The upper buffer unit 110 may include a feature data buffer unit 111 and a convolution kernel buffer unit 112. The feature data buffer unit 111 and the convolution kernel buffer unit 112 may store feature data and a convolution kernel, respectively, which are described referring to FIGS. 1A to 1C. Since the feature data buffer unit 111 stores a larger amount of data than the lower buffer unit 120 and transmits stored data with a value of zero to one or two of the lower buffer unit 120, the feature data buffer unit 111 may be implemented by using a static random access memory (SRAM) having high storage efficiency per area although the number of data read port is limited to one or two.

The lower buffer unit 120 may extract, for a predetermined time, the feature data and the convolution kernel for the convolution operation from the upper buffer unit 110 to store, and transmit the feature data and the convolution kernel to the operation unit 130 including a plurality of multipliers 131. The lower buffer unit 120 may include a first buffer unit 121 and a second buffer unit 122. The first buffer unit 121 may obtain data from the feature data buffer unit 111 and the second buffer unit 122 may obtain data from the convolution kernel buffer unit 112. Since the lower buffer unit 120 continuously supplies data to a plurality of the multipliers 131 in the operation unit 130, the lower buffer unit 120 may be implemented as a structure using flip-flops to read data of various positions at the same time and supply the data even though space efficiency is reduced.

The operation unit 130 may include the plurality of the multipliers 131 for performing multiplication using the data stored in the lower buffer unit 120. Each of the multipliers 131 may perform the multiplication between one element in the feature data and one element in the convolution kernel in parallel. In other words, each individual multiplication may be performed by being divided and assigned to the plurality of the multipliers 131.

The multiplication buffer 140 may store results of the multiplication performed by each of the multipliers 131 in the operation unit 130. The adder 150 may add together the results of the multiplication stored in the multiplication buffer 140 and transmit sum to the output buffer 160. The output buffer 160 may output a final result of the convolution operation.

FIG. 3B illustrates a detailed structure of the first buffer unit 121 in the lower buffer unit 120. Those illustrated in the FIG. 3B may be applied to not only the first buffer unit 121 but also the second buffer unit 122. In other words, the second buffer unit 122 may have a substantially identical structure of the first buffer unit 121. In FIG. 3B, components within a boundary of the first buffer unit 121 may be considered as sub-components included in the first buffer unit 121.

The first buffer unit 121 may include a data array 125 and a flag array 126. The data array 125 may include a plurality of unit memories 125a, and each of the unit memories 125a may be a single flip-flop. The plurality of the unit memories 125a may form the data array 125 by being arranged to constitute a P×Q matrix. In FIG. 3B, it is illustrated that P is four and Q is sixteen.

Similarly, the flag array 126 may also include a plurality of unit memories 126a, where each of the unit memories 126a may be a single flip-flop. The plurality of the unit memories 126a may also be arranged to constitute a P×Q matrix similarly to the unit memories 125a of the data array 125 to form the flag array 126.

Both the data array 125 and the flag array 126 may receive elements of the feature data from the feature data buffer unit 111, more specifically, as many elements as possible that may be stored in the data array 125 at once among elements of the feature data.

A single unit memory 125a included in the data array 125 may store a single element of the feature data. In general, the data read port of the upper buffer unit 110 is formed to transmit M number of data to the lower buffer unit 120 in a single cycle, and the unit memories 125a in the lower buffer unit 120 is formed to use an M-to-1 multiplexer (MUX) at an input side of the each unit memory 125a in the data array 125 to select and store an arbitrary element among the M number of data.

However, if the M-to-1 multiplexer is used for each input side of the unit memories 125a in the data array 125, a problem occurs that area efficiency of the lower buffer unit 120 is seriously degraded. Therefore, in the structure of the lower buffer unit 120 proposed in the present disclosure, by limiting that each unit memory 125a in the data array 125 is connected to single data at a fixed position among the M number of data transmitted from the upper buffer unit 110, the separate M-to-1 multiplexer is not used at each input side of the unit memories 125a in the data array 125.

If each of the unit memories 125a in the data array 125 is limited to be connected to one data at the fixed position among the M number of data transmitted through the data read port of the upper buffer unit 110, since data sequentially positioned in the upper buffer unit 110 is not sequentially positioned in the lower buffer unit 120. Therefore, additional processes may be performed to store information on whether each of the unit memories 125a in the data array 125 has a valid value or a meaningless dummy value (i.e. garbage value) and to identify that the unit memory 125a used for a current calculation during the convolution operation has the valid value. However, in a convolution operation structure with the operation unit 130 supporting a zero skip technique, a value of the flag array 126 may be set to interpret the meaningless dummy value as zero when the unit memory 125a in the data array 125 has the meaningless dummy value, and thus unit memories 125a in the data array 125 with valid values may be used for the convolution operation without an additional circuit for determining data validity in case of deleting the M-to-1 multiplexers.

An element stored in each unit memory 125a may be transmitted to the operation unit 130 outside the first buffer unit 121 through a multiplexer unit 127. The multiplexer unit 127 may include a plurality of multiplexers, and each of the multiplexers may select one of columns of the P×Q matrix formed by the unit memories 125a.

In a unit memory 126a included in the flag array 126, a flag value may be stored to determine whether a value of one unit memory 125a that has the same row number and the same column number as the unit memory 126a is zero or not. To this end, a plurality of zero detectors 129 may be provided to detect whether each element of the feature data is zero. By the plurality of zero detectors 129, the flag value may be stored in each unit memory 126a.

Elements stored in the each unit memory 126a may be transmitted to the operation unit 130 outside the first buffer unit 121 through a multiplexer unit 128. The multiplexer unit 128 may include a plurality of multiplexers, and each of the multiplexers may select one of the columns of the P×Q matrix formed by the unit memories 126a.

On the other hand, the second buffer unit 122 may also have an identical structure to the first buffer unit 121 described above. However, the second buffer unit 122 receives data from the convolution kernel buffer unit 112 rather than the feature data buffer unit 111. Accordingly, elements of the convolution kernel may be stored in unit memories 125a included in a data array 125 of the second buffer unit 122, and flag values determining whether the elements of the convolution kernel is zero or not may be stored in unit memories 126a included in a flag array 126 of the second buffer unit 122.

FIG. 3C shows a diagram for describing a configuration and operations of the operation unit 130 in more detail. By using data (NZ_Flag) of the flag array 126 each received from the first buffer unit 121 and the second buffer unit 122, and a value of a register storing a start position value (feature_start_position) of the feature data and a start position value (weight_start_position) of the convolution kernel in the operation unit 130, the operation unit 130 may detect a position where non-zero occurs at the first time among portions where an index value of the unit memories 125a in the data array 125 is larger than or equal to the start position value (feature_start_position) of the feature data.

The operation unit 130 may read both values regarding the detected position from the data array 125 in the first buffer unit 121 and the second buffer unit 122, multiply both values, and then add a value derived from the multiplication to a value stored in an accumulation (ACC) register (ACC_reg). Each of the start position value (feature_start_position) of the feature data and the start position value (weight_start_position) of the convolution kernel may be updated by adding a value which is one greater than an offset index of the data array 125 used in the current calculation to the start position value used in the current calculation.

Values of the feature data and the convolution kernel used by the plurality of multipliers 131 to perform the convolutional operation may be stored in the data array 125 of the first buffer unit 121 and the second buffer unit 122, and each of the multipliers 131 may access values in the data array 125 one after another for performing assigned calculation in the data array 125 by selecting the start position appropriately. As described above, those described with reference to FIG. 3C may be understood in more detail through examples of FIGS. 4A to 7B and Table 1 to be described later. According to the convolution operation device 100 described above with reference to FIGS. 3A to 3C, although reducing hardware components such as the multiplexers, the operation unit 130 may efficiently access the data stored in the lower buffer unit 120 and perform the convolution operation.

FIGS. 4A to 5C show diagrams illustrating a convolution operation process performed by the convolution operation device 100 according to one embodiment of the present disclosure. Referring to FIG. 4A, the feature data 10 having an M×N matrix (M and N are natural numbers, and M and N are five and six, respectively, in FIG. 4A) is illustrated. A plurality of sub-matrices 11a, 11b, 11c, and 11d may be extracted from the feature data 10 by the first buffer unit 121 of the convolution operation device 100 described with reference to FIGS. 3A to 3C.

Each of the plurality of sub-matrices may correspond to a separate portion each other in the feature data 10, and may be a K×L matrix having an identical dimension to the convolution kernel (K and L are natural numbers, and K and L are both three in FIG. 4A). The number of the sub-matrices may be determined based on the number of unit memories 125a included in the data array 125 of the convolution operation device 100 described with reference to FIGS. 3A through 3C.

The first buffer unit 121 may generate a first vector including elements, as elements of the first vector, included in at least one of the sub-matrices among the elements of the feature data 10. Referring to FIG. 4B, each element of the first vector may be stored one by one in unit memories 125a of the data array 125 of the first buffer unit 121. In addition, the second buffer unit 122 may generate a second vector including elements of the convolution kernel as elements of the second vector. Referring to FIG. 5C to be described later, each element of the second vector may be stored one by one in unit memories 125a of the data array 125 of the second buffer unit 122.

In more detail, unit memories with an identical row number among the unit memories 125a included in the data array 125 of the first buffer unit 121 or the data array 125 of the second buffer unit 122 may form a single unit memory set. Each unit memory set may be connected, to access, to a separate column of the feature data or the convolution kernel stored in the upper buffer unit 110, which is illustrated in FIG. 3B.

Herein, K number of data (the number of rows of the convolution kernel) in a single column of the feature data or the convolution kernel connected to the single unit memory set from a smallest column number may be filled one by one in each unit memory 125a in the single unit memory set in numerical order from the smallest column number.

The operation unit 130 may perform the convolution operation by using the first vector and the second vector. More specifically, the operation unit 130 may extract, for each of the sub-matrices, a partial vector including all elements of the sub-matrix from the first vector. In other words, the partial vector corresponding to each sub-matrix is a part of the first vector. Therefore, two elements adjacent in one sub-matrix are also adjacent in the first vector.

For each of the sub-matrices, the operation unit 130 may perform multiplication between each element in the partial vector corresponding to the sub-matrix and each element at a corresponding position in the second vector. Next, for each of the sub-matrices, the operation unit 130 may add results of the multiplication together and derive a result of the convolution operation using the convolution kernel. As described above, since a partial vector corresponding to a sub-matrix shares identical elements to the sub-matrix and the second vector shares identical elements to the convolution kernel, a result which is identical to the result of the convolution operation between the sub-matrices and the convolution kernel may be obtained through the operation between the partial vectors and the second vector.

Further, as described above, the multiplication between the elements in the partial vector and the second vector may be performed when both elements to be multiplied are not zero. A function of detecting a non-zero element may be achieved by a first flag vector and a second flag vector.

The first flag vector is for determining whether each element in the first vector is zero, and the second flag vector is for determining whether each element in the second vector is zero. The first flag vector may be generated by the first buffer unit 121 and the second flag vector may be generated by the second buffer unit 122, respectively.

Basically, the first flag vector may have the identical number of elements to the first vector and the second flag vector may have the identical number of elements to the second vector. If an i-th (i is a natural number) element in the first vector is zero, an i-th element in the first flag vector is also zero, and if a j-th (j is a natural number) element in the second vector is zero, a j-th element in the second flag vector is also zero. The operation unit 130 may determine whether an element in the first flag vector or the second flag vector is zero or not through identifying a value of each element in the first flag vector and the second flag vector.

However, referring to FIG. 4B, elements with shading lines that are not elements of the feature data 10 may be included in the elements of the first vector stored in the data array 125. This is related to a structure in which the unit memories 125a are arranged in the data array 125. Referring to FIG. 3A, a total of sixty-four unit memories 125a are arranged in four rows and sixteen columns. However, referring to FIG. 4A, since the total number of rows of the convolution kernel and each sub-matrix is three which is one smaller than the number of rows (P=4) formed by the unit memories 125a, filling three elements of the sub-matrix and one dummy value in the first vector may be repeated as one cycle of four elements. Those described for the first vector may be applied to the second vector so that filling three elements of the convolution kernel and one dummy value may be repeated as one cycle of four elements in the second vector.

In other words, if K, which is the number of rows of the convolution kernel and the sub-matrix, is smaller than a predetermined value (herein, P, the number of rows formed by the unit memories 125a), each elements that is at a position (r(row), c(column)) of the convolution kernel and the sub-matrix may be stored at a ((P*c)+r)th position in the first vector and the second vector. Further, arbitrary dummy values may be filled at other positions in the first vector and the second vector.

In other words, each element of the sub-matrix or the convolution kernel may be filled at an i-th position (i is a natural number) as a valid position in the first vector and the second vector where (i mod P) (a remainder when i is divided by P) is a natural number smaller than or equal to K, and arbitrary dummy values may be filled in other positions except the valid positions.

Of course, if the multiplication is actually performed on the dummy values, an exact result of the convolution operation cannot be derived. Therefore, the operation unit 130 considers the dummy values in the first vector and the second vector to be zero. Referring to FIG. 4B, each element with shading lines in the flag array 126 which corresponds to the position with the dummy value is zero.

Figure 5A:
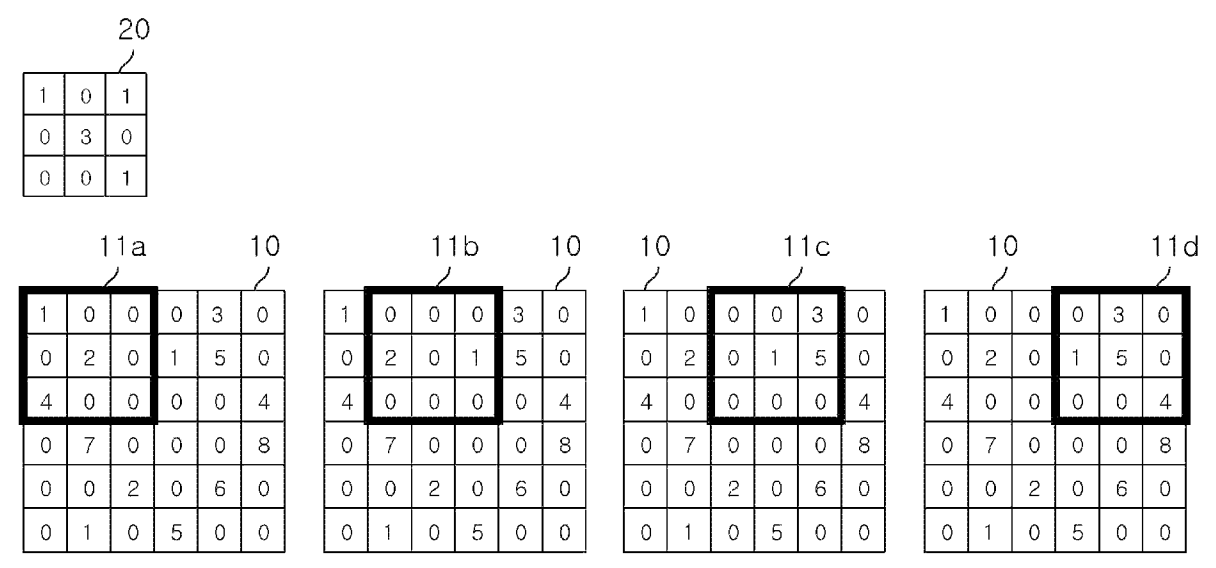
Figure 5B:
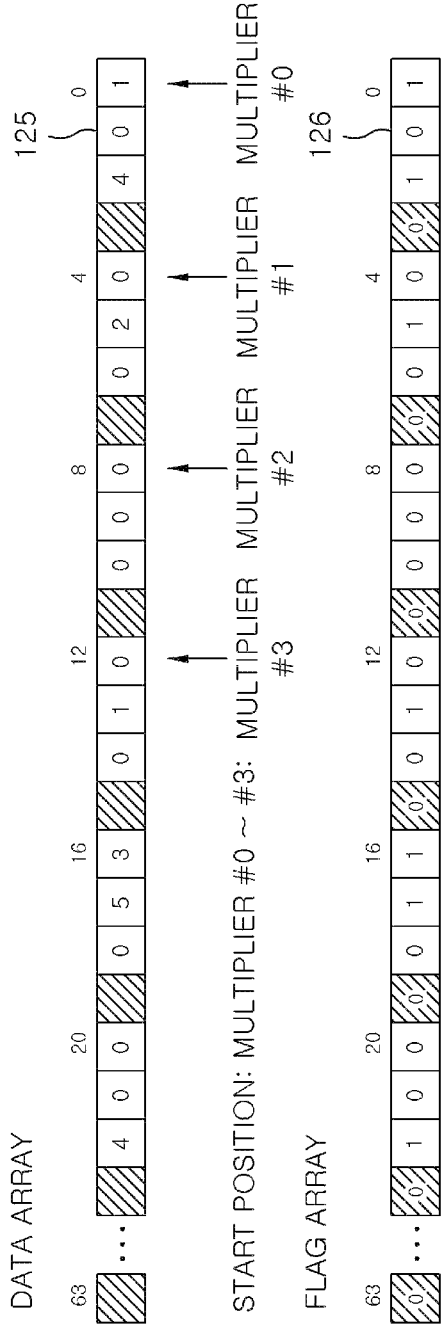
FIG. 5B shows a diagram illustrating a convolution operation process performed by a convolution operation device according to one embodiment of the present disclosure.
Figure 5C:
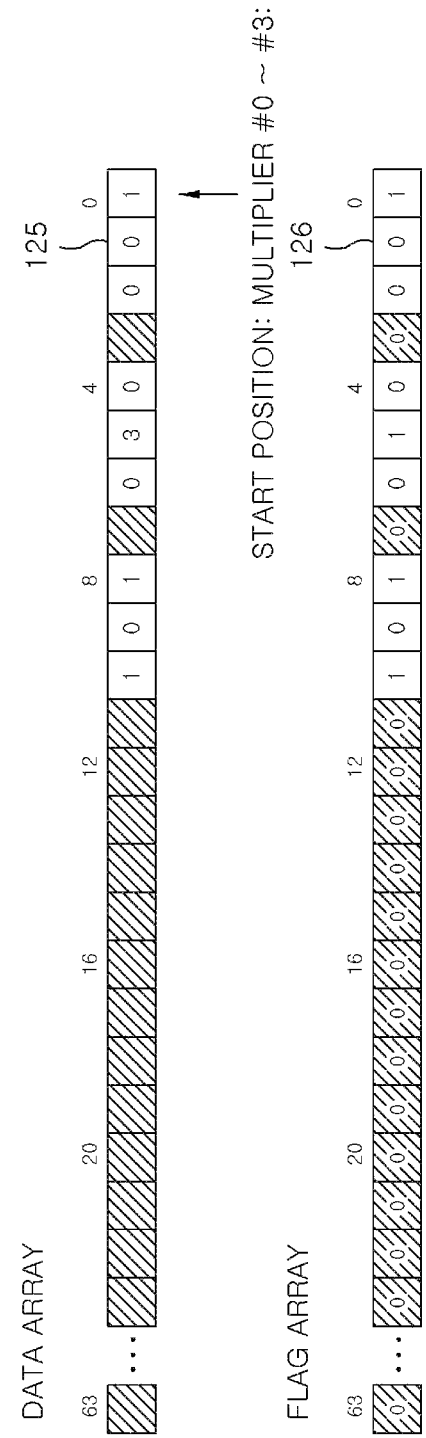
FIG. 5C shows a diagram illustrating a convolution operation process performed by a convolution operation device according to one embodiment of the present disclosure.

FIGS. 5A through 5C illustrate those described with reference to FIGS. 4A and 4B. A convolution kernel 20 and sub-matrices 11a, 11b, 11c, and 11d that may be extracted from the feature data 10 are illustrated in FIG. 5A. When performing the convolution operation, a scan direction of the convolution kernel 20 over the feature data 10 may be a row direction (a horizontal direction), more specifically, a left-to-right direction. Further, a stride (scan interval) may be one, and a unit of the stride is an element. Therefore, each sub-matrix is arranged in the horizontal direction with a space of one element.

In other words, if the stride of each sub-matrix is v (v is a natural number), a plurality of sub-matrices may be extracted that each of the sub-matrices are aligned with an adjacent sub-matrix on the feature data 10 with a space of v elements in the row direction.

Hereinafter, the scan direction will be described as the row direction, however, if the scan direction is a column direction, an embodiment of the present disclosure may be directly applied by replacing description about the row with description about the column.

As illustrated in FIG. 5B, elements in the feature data 10 included in at least one of the sub-matrices may be stored in the data array 125 of the first buffer unit 121. Hereinafter, a criterion by which the first vector is arranged in the data array 125 will be described. Each element in the first vector may be arranged in the first vector according to magnitude of the row number and the column number that the each element has in the feature data 10. More specifically, each of the elements may be arranged to position at the front in the first vector as the column number is smaller, and as the row number is smaller when the column numbers are identical. In other words, since the scanning direction is the row direction, the alignment priority of the column number may be set to be higher than that of the row number.

Referring to FIG. 5B, an element at the right side of the data array 125 is illustrated as an "element at the front". This standard of illustration is applied to the figures illustrating the data array 125 or the flag array 126. Further, as described above, elements having dummy values may be inserted into the first vector, and accordingly, the dummy values may be stored in the data array 125 at regular intervals.

The first flag vector may be stored in the flag array 126 of the first buffer unit 121. As illustrated in FIG. 5B, each element in the first flag vector indicates whether each element in the first vector is zero or not. Further, referring to FIG. 5B, elements in the first flag vector at corresponding positions to dummy elements in the first vector are zero. In other words, the dummy elements are considered as zero regardless of actual values. Elements with values of one in the first flag vector indicate that elements at corresponding positions in the first vector are not zero.

Further, referring to FIG. 5C, each element in the second vector extracted from the convolution kernel 20 may be stored in the data array 125 of the second buffer unit 122, and the second flag vector for indicating whether a value of each element in the second vector is zero may be stored in the flag array 126. Elements in the second vector that are not extracted from the convolution kernel 20 have dummy values, and accordingly, elements at corresponding positions in the second flag vector to the dummy values have also values of zero.

As described above, each of the sub-matrices 11a, 11b, 11c, and 11d of the feature data 10 may have its own partial vector in the first vector. Starting positions illustrated in FIG. 5B indicate where each sub-matrix starts in the first vector. Specifically, four multipliers #0, #1, #2, and #3 of the multipliers 131 of the operation unit 130 may perform, in parallel, the convolution operation between the convolution kernel 20 and each of the sub-matrices 11a, 11b, 11c, and 11d. Herein, each of the four multipliers 131 may obtain values of elements of the sub-matrix of which each multiplier 131 takes charge by starting excess to the data array 125 from its starting position illustrated in FIG. 5b.

Alternatively, since the convolution kernel 20 is equally applied to each of the different sub-matrices, each starting position of the multipliers 131 is equally applied in the data array 125 storing the second vector extracted from the convolution kernel 20 in FIG. 5C.

Below table 1 indicates a summary of a process of performing the convolution operation in an example as illustrated in FIGS. 5A to 5C. When a method according to one embodiment of the present disclosure is applied, the convolution operation in the example of FIGS. 5A to 5C may be completed in a short time of 3 cycles.

of the first block matrices and each of the second block matrices, the number of rows may not exceed the number of rows of the unit memories 125*a* and the number of columns may be determined to be equal to the number of columns of the convolution kernel 20.

FIGS. 6B and 6C illustrate a first vector and a first flag vector in the case where splitting of the convolution kernel is applied. FIG. 6B illustrates a situation in which the first

TABLE 1

| Cycle | MAC_Unit | Current Start_Position | | Index_Offset | Data array Index | | Next Start_Position | | Conv. Finished | Data Value | | Mul result | Acc_Reg | |
|---|---|---|---|---|---|---|---|---|---|---|---|---|---|---|
| | | Feature | Weight | | Feature | Weight | Feature | Weight | | Feature | Weight | | Current | Next |
| 0 | 0 | 0 | 0 | 0 | 0 | 0 | 1 | 1 | 0 | 1 | 1 | 1 | 0 | 1 |
| | 1 | 4 | 0 | 60 | — | — | 64 | — | 1 | — | — | — | 0 | 0 |
| | 2 | 8 | 0 | 5 | 13 | 5 | 14 | 6 | 0 | 1 | 3 | 3 | 0 | 3 |
| | 3 | 12 | 0 | 5 | 17 | 5 | 18 | 6 | 0 | 5 | 3 | 15 | 0 | 15 |
| 1 | 0 | 1 | 1 | 4 | 5 | 5 | 6 | 6 | 0 | 2 | 3 | 6 | 1 | 7 |
| | 1 | — | — | — | — | — | — | — | 1 | — | — | — | 0 | 0 |
| | 2 | 14 | 6 | 2 | 16 | 8 | 64 | — | 0 | 3 | 1 | 3 | 3 | 6 |
| | 3 | 18 | 6 | 4 | 22 | 10 | 23 | 11 | 0 | 4 | 1 | 4 | 15 | 19 |
| 2 | 0 | 6 | 6 | 58 | — | — | 64 | — | 1 | — | — | — | 7 | 7 |
| | 1 | — | — | — | — | — | — | — | 1 | — | — | — | 0 | 0 |
| | 2 | — | — | — | — | — | — | — | 1 | — | — | — | 6 | 6 |
| | 3 | 23 | 11 | 41 | — | — | 64 | — | 1 | — | — | — | 19 | 19 |

Figure 6A:
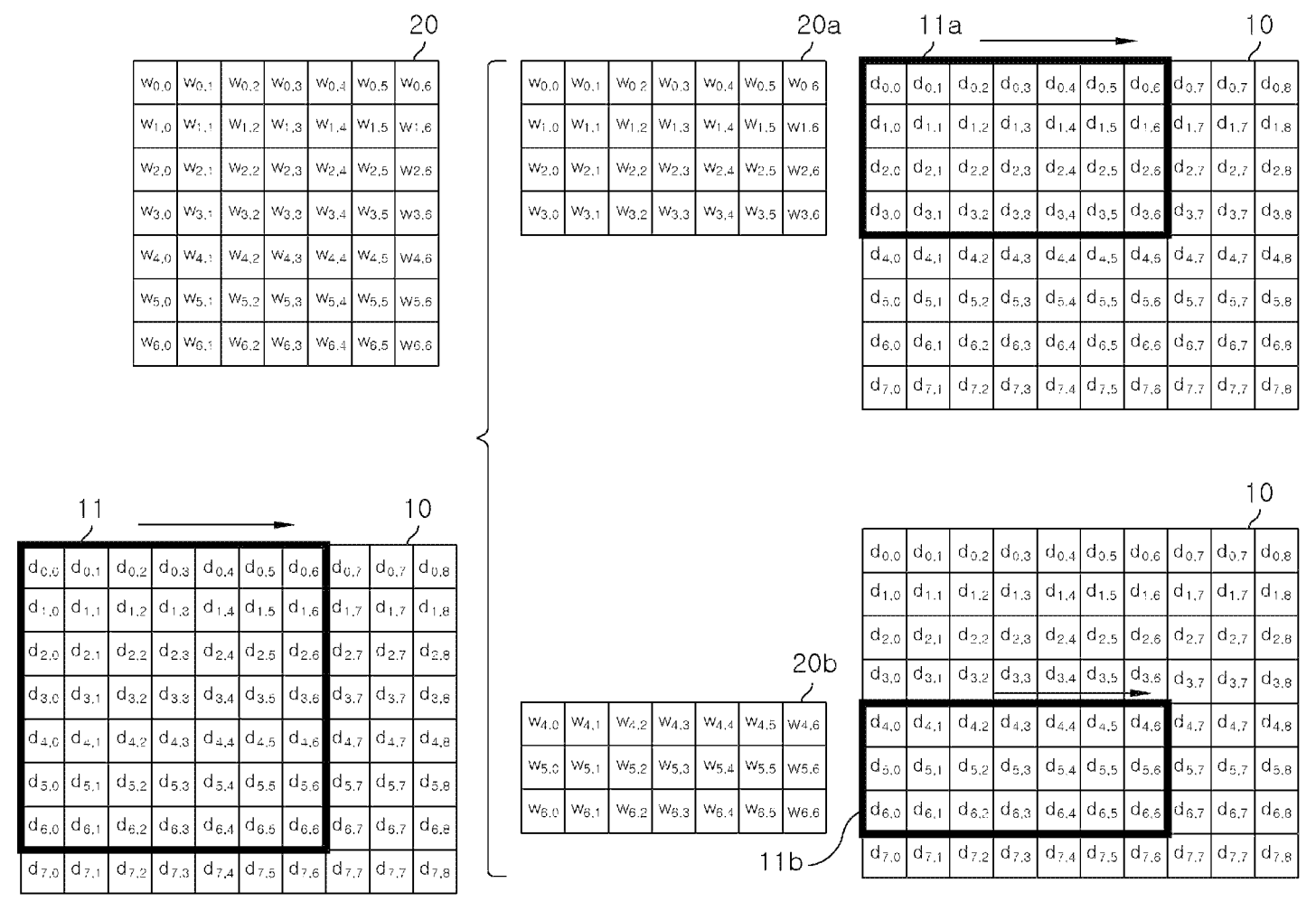

FIGS. 6A to 6C show diagrams illustrating a case where splitting of a convolution kernel is applied in a convolution operation process according to one embodiment of the present disclosure. The convolution kernel 20 in FIG. 6A has seven rows which exceeds four that is the number of rows formed by the unit memories 125*a* of the convolution operation device 100 illustrated in FIG. 3B. As described above, if the number of rows of the convolution kernel 20 exceeds a predetermined value which may be determined by the number of rows of the unit memories 125*a*, the convolution operation may be performed by splitting each of the convolution kernel 20 and a sub-matrix to which the convolution kernel 20 is to be applied.

If the splitting of the convolutional kernel is not applied, as illustrated in FIG. 6A, a sub-matrix 11 may be extracted from the feature data 10 and the convolutional operation may be performed between the convolutional kernel 20 and the extracted sub-matrix 11. Alternatively, if the splitting of the convolution kernel is applied, as illustrated in FIG. 6A, the operation unit 130 may split the sub-matrix 11 to generate two separate first block matrices 11*a* and 11*b* and also split the convolution kernel 20 to generate two separate second block matrices 20*a* and 20*b*. The number of rows of the block matrices may be identical to the number of rows of the unit memories 125*a*. Alternatively, if the number of rows of the convolution kernel 20 is not a multiple of the number of rows of the unit memories 125*a*, a block matrix of which the number of rows is smaller than the number of rows of the unit memories 125*a* may be generated.

In other words, the operation unit 130 may split a sub-matrix into R (R is a natural number equal to or larger than two) number of first block matrices and split the convolution kernel into R number of second block matrices. Further, the operation unit 130 may aggregate results of the convolution operation, performed for every i, between an i-th (i is a natural number equal to or larger than one and equal to or smaller than R) block matrix among the first block matrices and an i-th block matrix among the second block matrices to derive a result of the convolution operation between the sub-matrix and the convolution kernel 20. Herein, for each vector derived from the first block matrix 11*a* and the first flag vector for the first vector are stored in the data array 125 and the flag array 126, respectively. FIG. 6C illustrates a situation in which the first vector derived from the first block matrix 11*b* and the first flag vector for the first vector are stored in the data array 125 and the flag array 126, respectively. Except that the splitting of the convolution kernel is applied, the description with reference to FIGS. 5B and 5C may also be applied to FIGS. 6B and 6C.

Figure 7A:
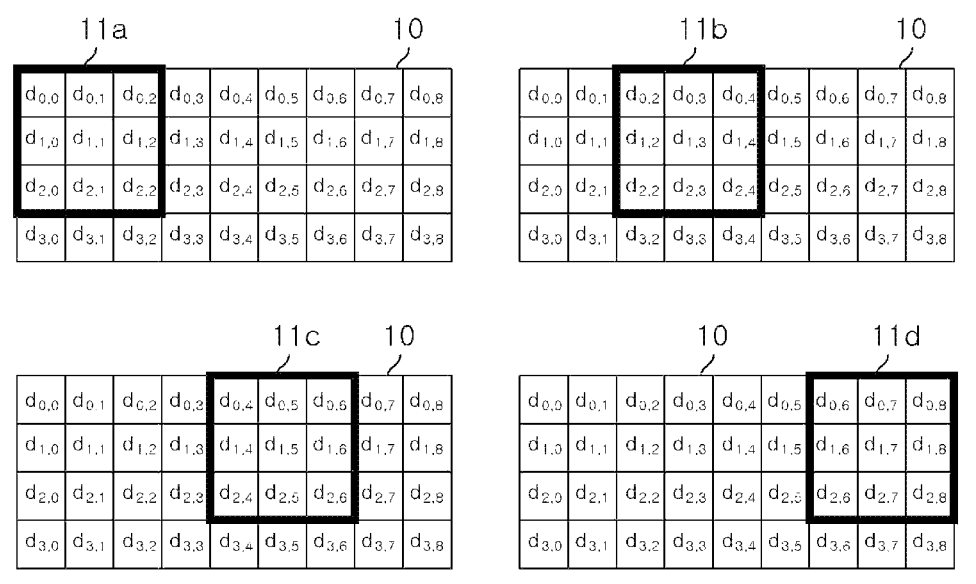
Figure 7B:
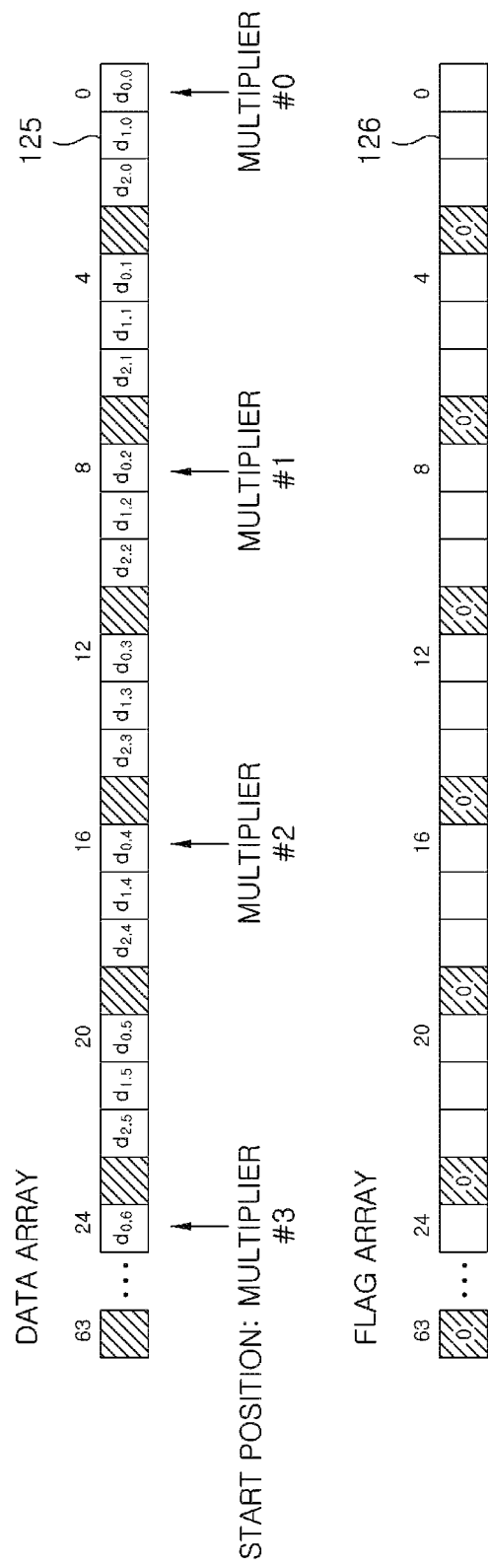
FIG. 7B shows a diagram illustrating a case where increase of a stride is applied in a convolution operation process according to one embodiment of the present disclosure.

FIGS. 7A and 7B show diagrams illustrating a case where increase of a stride is applied in a convolution operation process according to one embodiment of the present disclosure. The stride may be one as illustrated above, but equal to or larger than two.

As illustrated in FIG. 7A, the stride is two (elements). Accordingly, each sub-matrix 11*a*, 11*b*, 11*c*, and 11*d* of the feature data 10 may be aligned in a horizontal direction with a space of two elements in the feature data 10. FIG. 7B illustrates a situation in which a first vector derived from each sub-matrix 11*a*, 11*b*, 11*c*, and 11*d*, and a first flag vector for the first vector are stored in the data array 125 and the flag array 126, respectively. Except that the increase of the stride is applied, the description with reference to FIGS. 5B and 5C may also be applied to FIG. 7B.

Figure 8:
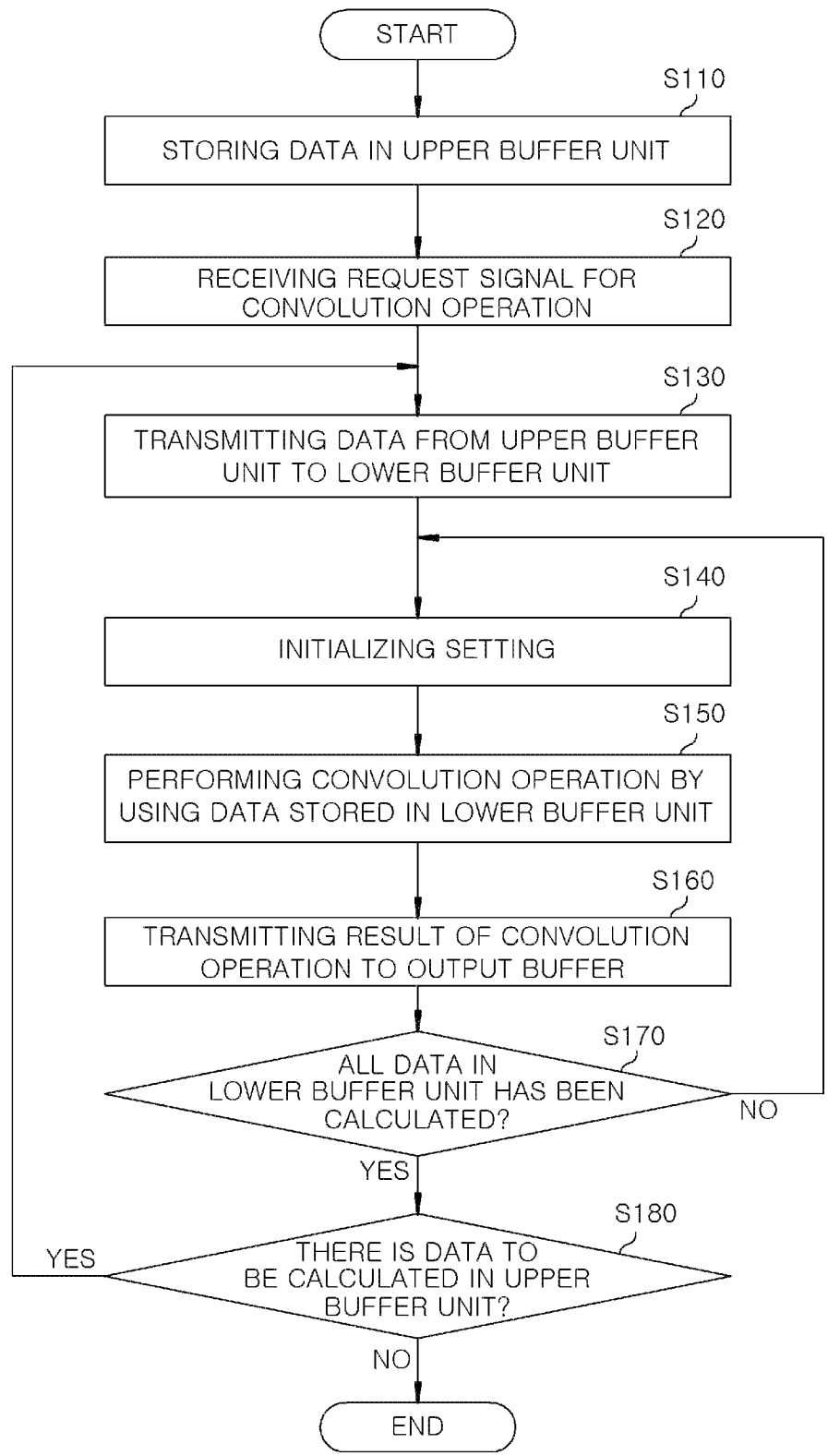
FIG. 8 shows a flowchart illustrating each step of a convolution operation method according to one embodiment of the present disclosure.

FIG. 8 shows a flowchart illustrating each step of a convolution operation method according to one embodiment of the present disclosure. Methods of FIG. 8 and FIG. 9 to be described later may be performed by the convolution operation device 100 described with reference to FIGS. 3A to 3C. However, since the methods illustrated in FIGS. 8 and 9 are just embodiments of the present disclosure, ideas of the present disclosure are not limited by FIGS. 8 and 9, and each step of the methods illustrated in FIGS. 8 and 9 may be performed in a different order from the figures.

At first, in a step S110, data such as feature data and a convolution kernel may be stored in the upper buffer unit 110. In a step S120, if a request signal for starting a convolution operation is received from a processor (not illustrated) for controlling the convolution operation device 100, in a step S130, the lower buffer unit 120 may receive the data from the upper buffer unit 110. Then, in a step S140, the operation unit 130 may initialize a setting for the convolution operation. Next, in a step S150, the operation unit 130 may perform the convolution operation by using the data stored in the lower buffer 120, and in a step S160, the operation unit 130 may transmit a result of the convolution operation to the output buffer 160 through the multiplication buffer 140 and the adder 150.

In a step S170, the operation unit 130 may determine whether all the data stored in the lower buffer unit 120 has been calculated. If all of the data has not been calculated, the step S170 proceeds to the step S140, however, if all the data has been calculated, in a step S180, the operation unit 130 may determine whether data to be further calculated remains in the upper buffer 110. If there is data to be further calculated, the step S180 proceeds to step S130, however, if there is no data to be further calculated, the operation unit 130 may stop performing the method.

Figure 9:
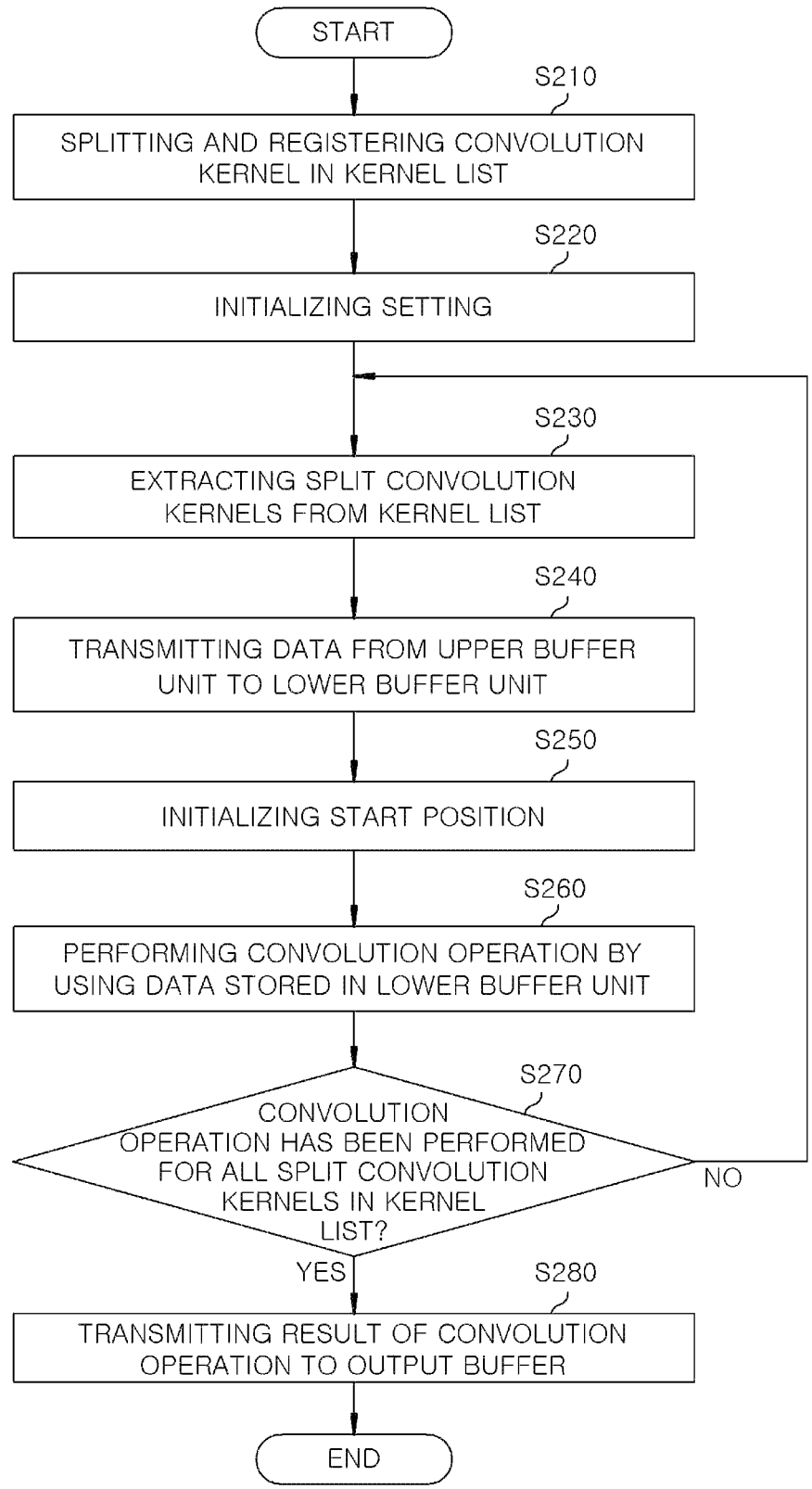
FIG. 9 shows a flowchart illustrating each step of a case where splitting of a convolution kernel is applied in a convolution operation method according to one embodiment of the present disclosure.

FIG. 9 shows a flowchart illustrating each step of a case where splitting of a convolution kernel is applied in a convolution operation method according to one embodiment of the present disclosure.

At first, in a step S210, the convolutional kernel may be split, and each split convolution kernel (corresponding to the second block matrix in FIGS. 6A to 6C) may be registered in a kernel list. Then, in a step S220, the operation unit 130 may initialize a setting for the convolution operation, and, in a step S230, the operation unit 130 may extract the split convolution kernels from the kernel list. In a step S240, the lower buffer unit 120 may receive data for the convolution operation from the upper buffer unit 110.

In a step S250, the operation unit 130 may initialize a start position of each multiplier 131, and in a step S260, the operation unit 130 may perform the convolution operation by using the data stored in the lower buffer unit 120. Next, in a step S270, the operation unit 130 may determine whether the convolution operation has been performed for all split convolution kernels in the kernel list. If the convolution operation has not been performed for all split convolution kernels, the step S270 proceeds to the step S230. However, if the convolution operation has been performed for all split convolution kernels, in a step S280, a result of the convolution operation may be transmitted to the output buffer 160 through the multiplication buffer 140 and the adder 150. Then, the operation unit 130 may stop performing the method.

According to one embodiment of the present disclosure, the effect for implementing the device, such as space efficiency, may be achieved, and the efficiency in calculation may be achieved together. In addition, since convolution kernels and strides of various sizes are supported, convenience may be further improved.

According to one embodiment of the present disclosure, since the efficiency in calculation and rationalization for implementing the device may be achieved together in performing the convolution operation, operations using a feature extraction model such as a convolution neural network may be performed more effectively.

What is claimed is:

1. A convolution operation method implemented by a hardware including a processor and a memory, the method comprising:

extracting, from a feature data with a M×N matrix (M and N are a natural number), a plurality of separate sub-matrices which have identical dimensions to a convolution kernel with a K×L matrix (K is a natural number equal to or smaller than M, and L is a natural number equal to or smaller than N);

generating a first vector which includes elements of at least one of the sub-matrices as elements of the first vector, and a second vector which includes elements of the convolution kernel as elements of the second vector;

extracting, from the first vector, a partial vector including all elements of the sub-matrix, for each of the sub-matrices;

deriving a result of a convolution operation by multiplying between each element of the partial vector corresponding to each of the sub-matrices and each element at a corresponding position in the second vector, and by adding results of the multiplication, and generating a first flag vector determining whether each element of the first vector is zero, and a second flag vector determining whether each element of the second vector is zero, and wherein the deriving a result includes:

determining for each element of the partial vector that if an element of the first flag vector is zero, an element at a corresponding position in the partial vector is zero; and determining for each element of the second vector that if an element of the second flag vector is zero, an element at a corresponding position in the second vector is zero.

2. The convolution operation method of claim 1, wherein the deriving a result includes performing the multiplication when both elements to be multiplied are not zero.

3. The convolution operation method of claim 1, wherein the convolution operation between each of the separate sub-matrices and the convolution kernel is performed in parallel by using separate multipliers.

4. The convolution operation method of claim 1, wherein if a scan direction for the convolution operation is a row direction and a stride is v (v is a natural number and a unit of the stride is an element), the plurality of the sub-matrices are extracted that each sub-matrix is aligned with an adjacent sub-matrix with a space of v in the feature data in the row direction.

5. The convolution operation method of claim 4, wherein each element of the first vector and each element of the second vector are aligned in the first vector and the second vector, respectively, based on magnitude of a row number and a column number (the row number and the column number are natural numbers) which each element has in the feature data or the convolution kernel that each element is arranged to position at front in the first vector or the second vector as the column number is smaller, and as the row number is smaller when the column numbers are identical.

6. The convolution operation method of claim 4, wherein if the K is smaller than P (P is a natural number) that is determined based on a memory structure storing the first vector or the second vector, an element of the sub-matrix or the convolution kernel is filled in an i-th position (i is a natural number) as a valid position of the first vector and the second vector where a value of "i mod P" is a natural number smaller than or equal to the K, and arbitrary dummy value is filled in another position except the valid position, and the deriving a result includes considering the dummy value of the first vector and the second vector to be zero.

7. The convolution operation method of claim 1, wherein if a scan direction for the convolution operation is a row direction and K is larger than a predetermined value, the sub-matrix and the convolution kernel are split into R (R is a natural number equal to or larger than two) number of first block matrices and R number of second block matrices, respectively, and a result of the convolution operation between each of the sub-matrices and the convolution kernel is derived by adding results of convolution operations, performed for every i, between an i-th (i is a natural number equal to or smaller than R) matrix among the first block matrices and an i-th matrix among the second block matrices, and the number of rows is equal to or smaller than the predetermined value and the number of columns is L, for each of the first block matrices and each of the second block matrices.

8. A convolution operation device comprising:

a first buffer unit configured to extract, from a feature data with a M×N matrix (M and N are a natural number), a plurality of separate sub-matrices which have identical dimensions to a convolution kernel with a K×L matrix (K is a natural number equal to or smaller than M, and L is a natural number equal to or smaller than N) and to generate a first vector which includes elements of at least one of the sub-matrices as elements of the first vector;

a second buffer unit configured to generate a second vector which includes elements of the convolution kernel as elements of the second vector; and an operation unit configured to extract, from the first vector, a partial vector including all elements of the sub-matrix, for each of the sub-matrices, and to derive a result of a convolution operation by multiplying between each element of the partial vector corresponding to each of the sub-matrices and each element at a corresponding position in the second vector, and by adding results of the multiplication, wherein the first buffer unit is further configured to generate a first flag vector determining whether each element of the first vector is zero, the second buffer unit is further configured to generate a second flag vector determining whether each element of the second vector is zero, and the operation unit is further configured to determine for each element of the partial vector that if an element of the first flag vector is zero, an element at a corresponding position in the partial vector is zero, and to determine for each element of the second vector that if an element of the second flag vector is zero, an element at a corresponding position in the second vector is zero.

9. The convolution operation device of claim 8, wherein the operation unit is configured to perform the multiplication when both elements to be multiplied are not zero.

10. The convolution operation device of claim 8, the device further comprising:

an upper buffer unit configured to store the feature data and the convolution kernel, the upper buffer unit connected to the first buffer unit and the second buffer unit, wherein the first buffer unit is further configured to obtain a value of each element of the feature data from the upper buffer unit, and the second buffer unit is further configured to obtain a value of each element of the convolution kernel from the upper buffer unit.

11. The convolution operation device of claim 8, wherein the operation unit includes a plurality of multipliers, and the convolution operation between each of the separate sub-matrices and the convolution kernel is performed in parallel by using separate multipliers among the plurality of the multipliers.

12. The convolution operation device of claim 8, wherein if a scan direction for the convolution operation is a row direction and a stride is v (v is a natural number and a unit of the stride is an element), the plurality of the sub-matrices are extracted that each sub-matrix is aligned with an adjacent sub-matrix with a space of v in the feature data in the row direction.

13. The convolution operation device of claim 12, wherein each element of the first vector and each element of the second vector are aligned in the first vector and the second vector, respectively, based on magnitude of a row number and a column number (the row number and the column number are natural numbers) which each element has in the feature data or the convolution kernel that each element is arranged to position at front in the first vector or the second vector as the column number is smaller, and as the row number is smaller when the column numbers are identical.

14. The convolution operation device of claim 8, wherein each of the first buffer unit and the second buffer unit includes a data array including a plurality of unit memories that are arranged to form a P×Q matrix (P and Q are natural numbers equal to or larger than two), the first buffer unit is further configured to store each element of the first vector in separate unit memories in the data array of the first buffer unit, and the second buffer unit is further configured to store each element of the second vector in separate unit memories in the data array of the second buffer unit.

15. The convolution operation device of claim 14, wherein if the K is smaller than P, each element of the sub-matrix is filled at a (P×col+row)th position ("row" and "col" are a row number and a column number which each element has in the sub-matrix or the convolution kernel) of the first vector, each element of the convolution kernel is filled at a (P×col+row)th position of the second vector, and arbitrary dummy value is filled in another unit memory, and the operation unit is further configured to consider the dummy value stored in the data array of the first buffer unit or the second buffer unit to be zero.

16. The convolution operation device of claim 14, wherein if a scan direction for the convolution operation is a row direction and K is larger than P, the operation unit is further configured to split the sub-matrix into R (R is a natural number equal to or larger than two) number of first block matrices, to split the convolution kernel into R number of second block matrices, to derive a result of the convolution operation between each of the sub-matrices and the convolution kernel by adding results of convolution operations, performed for every i, between an i-th (i is a natural number equal to or smaller than R) matrix among the first block matrices and an i-th matrix among the second block matrices, and the number of rows is equal to or smaller than P and the number of columns is L, for each of the first block matrices and each of the second block matrices.

17. The convolution operation device of claim 14, wherein unit memories that are on a same row among unit memories stored in the data array of the first buffer unit or the data array of the second buffer unit form a unit memory set, and each unit memory set is connected to a separate column of the feature data or the convolution kernel to access, which are stored in the upper buffer unit.

18. A non-transitory computer-readable storage medium including computer executable instructions, wherein the instructions, when executed by a processor, cause the processor to: extract, from a feature data with a M×N matrix (M and N are a natural number), a plurality of separate submatrices which have identical dimensions to a convolution kernel with a K×L matrix (K is a natural number equal to or smaller than M, and L is a natural number equal to or smaller than N);

generate a first vector which includes elements of at least one of the sub-matrices as elements of the first vector, and a second vector which includes elements of the convolution kernel as elements of the second vector;

extract, from the first vector, a partial vector including all elements of the sub-matrix, for each of the sub-matrices;

derive a result of a convolution operation by multiplying between each element of the partial vector corresponding to each of the sub-matrices and each element at a corresponding position in the second vector, and by adding results of the multiplication; and generate a first flag vector determining whether each element of the first vector is zero, and a second flag vector determining whether each element of the second vector is zero, and wherein the deriving a result includes:

determining for each element of the partial vector that if an element of the first flag vector is zero, an element at a corresponding position in the partial vector is zero; and determining for each element of the second vector that if an element of the second flag vector is zero, an element at a corresponding position in the second vector is zero.

* * * * *